3,330,850
CYCLOALIPHATIC TETRAISOCYANATES
Clyde D. Campbell, Wheeling, and James M. Cross and Sidney H. Metzger, Jr., New Martinsville, W. Va., assignors to Mobay Chemical Company, Pittsburgh, Pa., a corporation of Delaware
No Drawing. Filed Sept. 18, 1964, Ser. No. 397,623
5 Claims. (Cl. 260—453)

This invention relates to cycloaliphatic tetraisocyanates and more particularly, cycloaliphatic tetraisocyanates based on tolylene diamine as a starting material.

It is known to prepare condensation products of mixtures of diamines including tolylene diamines with aldehydes to thereby produce tetraamines having two aromatic nuclei. In copending application S. N. 397,645 filed simultaneously herewith, it is disclosed and claimed to reduce aromatic tetraamines based on tolylene diamine to cycloaliphatic tetraamines.

It is therefore an object of this invention to provide cycloaliphatic tetraisocyanates. It is another object of this invention to provide cycloaliphatic tetraisocyanates using tolylene diamine as a starting material. It is another object to produce bis(methyl, diisocyanatocyclohexyl)alkanes.

The foregoing objects and others which will become apparent from the following description are accomplished in accordance with the invention, generally speaking, by providing bis(methyl, diisocyanatocyclohexyl)alkanes by condensing tolylene diamine with an aldehyde to produce an aromatic tetraamine, hydrogenating the tetraamine to the corresponding cycloaliphatic compound and then phosgenating the cycloaliphatic tetraamine to the corresponding isocyanate. In the preparation of the aromatic tetraamine, any isomer or mixtures of tolylene diamine may be used such as, for example, 2,4-tolylene diamine, 2,6-tolylene diamine, 2,5-tolylene diamine, 2,3-tolylene diamine and 3,4-tolylene diamine. It is preferred, however, that 2,4-tolylene diamine or an isomeric mixture of 2,4- and 2,6-tolylene diamine be used.

The resulting tetraisocyanate has the following formula:

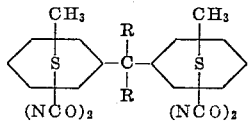

where R is hydrogen, lower alkyl or phenyl. In the condensation of the tolylene diamine with an aldehyde, any suitable aldehyde or ketone may be used, such as, for example, formaldehyde, propionaldehyde, benzylaldehyde, butyraldehyde, acetaldehyde and the like, acetone, diethyl ketone, methylethyl ketone, methylpropyl ketone, methylisobutyl ketone, methyl-n-amyl-ketone and the like. It is preferred that formaldehyde be used.

As disclosed in the aforementioned copending application, any suitable hydrogenation catalyst may be used for reducing the aromatic tetraamine to the corresponding cycloaliphatic tetraamine. The phosgenation is accomplished by conventional techniques and preferably in an inert solvent such as o-dichlorobenzene.

The invention is further illustrated but not limited by the following examples in which parts are by weight unless otherwise specified.

EXAMPLE 1

Preparation of aromatic tetraamine

About 30 parts of formaldehyde are added to about 250 parts of 2,4-tolylene diamine and about 900 parts of an 11% sulphuric acid solution. The condensation takes place and the tetraamino product having the formula

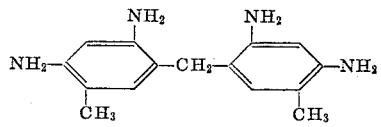

is recrystallized from 1,4-dioxane, having a melting point of from 202° to 204° C.

EXAMPLE 2

Preparation of cycloaliphatic tetraamine

In a one-liter stainless steel stirred autoclave is charged about 19.7 parts of bis(2,4-diamino-5-methylphenyl) methane, about 2.0 parts of ruthenium dioxide and about 200 parts by volume of dioxane (distilled from sodium). The autoclave is purged several times with hydrogen by building the pressure to 200–250 p.s.i.g. and bleeding. The contents of the autoclave are heated to about 142° C. and then pressured to about 4500 p.s.i.g. with hydrogen. After stirring 22 hours at from about 134 to about 155° C. a sample is removed for infrared analysis. The spectrum shows a considerable reduction of the benzoid rings to cyclohexyl rings. The reduction is continued for an additional 23 hours at from about 144 to about 154° C. After cooling, the contents of the autoclave are filtered under suction through a preformed charcoal filter cake. The dioxane is stripped in vacuo leaving a light red oil, which is very viscous at room temperature, but rapidly thins with heat. The infrared spectrum shows only a trace of aromatic material left and is consistent with the following structure

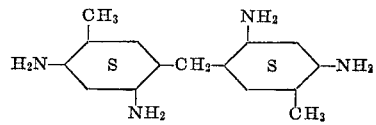

The compound is soluble in water.

EXAMPLE 3

Preparation of cycloaliphatic tetraisocyanate

About 1 part of bis(2,4-diamino-5-methyl cyclohexyl) methane as prepared in Example 2 is dissolved in about 10 parts of dry o-dichlorobenzene. In a separate container, about 10 parts of dry o-dichlorobenzene is stirred at 0° C. with phosgene. The amine solution is then added slowly with stirring of the cold phosgene solution while the temperature is maintained at from about 0 to about 5° C. A fine slurry results. This mixture is brought to room temperature with stirring and a continuous stream of phosgene is passed through the slurry. Vigorous stirring is continued and phosgene is continuously passed through the mixture for one hour at room temperature, two hours at 50° C., 2 hours at 75° C. and finally for 4 hours at 100° C. At this point, the reaction mixture is a dark, clear mixture. Heating is continued for 5 hours at 125° C. and then for 2 hours at 150° C. The reaction mixture is degassed with a nitrogen purge and the o-dichlorobenzene is removed under vacuo. Infrared analysis establishes the presence of isocyanate groups and the obsence of aromaticity and amino groups.

It is, of course, to be understood any of the isomers or mixtures of isomers of tolylene diamine may be used in the condensation with any of the aldehydes or ketones mentioned to prepare the aromatic tetraamine which can be used as the starting material to prepare the compositions of this invention. The compounds of this invention are useful in the preparation of urethane polymers by reaction with active hydrogen containing compounds.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. Bis(methyl, diisocyanatocyclohexyl)alkanes.
2. Bis(methyl, diisocyanatocyclohexyl)methanes.
3. Bis(2,4-diisocyanato-5-methyl cyclohexyl) methane.
4. Bis(2,4-diisocyanato-3-methyl cyclohexyl)methane.
5.

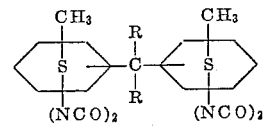

where R is a member selected from the group consisting of hydrogen, a lower alkyl or phenyl.

No references cited.

CHARLES B. PARKER, *Primary Examiner.*

DOLPH TORRENCE, *Assistant Examiner.*